US009819567B1

(12) United States Patent
Uppal et al.

(10) Patent No.: US 9,819,567 B1
(45) Date of Patent: Nov. 14, 2017

(54) TRAFFIC SURGE MANAGEMENT FOR POINTS OF PRESENCE

(71) Applicant: Amazon Technologies, Inc., Seattle, WA (US)

(72) Inventors: Hardeep Singh Uppal, Seattle, WA (US); Prashanth Acharya, Issaquah, WA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 14/673,305

(22) Filed: Mar. 30, 2015

(51) Int. Cl.
G06F 15/16 (2006.01)
H04L 12/26 (2006.01)
H04L 12/707 (2013.01)

(52) U.S. Cl.
CPC .............. H04L 43/16 (2013.01); H04L 45/22 (2013.01)

(58) Field of Classification Search
CPC ................................ H04L 43/16; H04L 45/22
See application file for complete search history.

(56) References Cited

U.S. PATENT DOCUMENTS

| 5,063,500 | A | 11/1991 | Shorter |
| 5,341,477 | A | 8/1994 | Pitkin et al. |
| 5,459,837 | A | 10/1995 | Caccavale |
| 5,611,049 | A | 3/1997 | Pitts |
| 5,701,467 | A | 12/1997 | Freeston |
| 5,764,910 | A | 6/1998 | Shachar |
| 5,774,660 | A | 6/1998 | Brendel et al. |
| 5,852,717 | A | 12/1998 | Bhide et al. |
| 5,892,914 | A | 4/1999 | Pitts |
| 5,893,116 | A | 4/1999 | Simmonds et al. |
| 5,895,462 | A | 4/1999 | Toki |
| 5,905,248 | A | 5/1999 | Russell et al. |
| 5,933,811 | A | 8/1999 | Angles et al. |
| 5,937,427 | A | 8/1999 | Shinagawa et al. |

(Continued)

FOREIGN PATENT DOCUMENTS

| CA | 2741 895 A1 | 5/2010 |
| CN | 1422468 A | 6/2003 |

(Continued)

OTHER PUBLICATIONS

Armour et al.: "A Heuristic Algorithm and Simulation Approach to Relative Location of Facilities"; Management Science, vol. 9, No. 2 (Jan. 1963); pp. 294-309.

(Continued)

*Primary Examiner* — Moustafa M Meky
*Assistant Examiner* — Andrea Hurst
(74) *Attorney, Agent, or Firm* — Knobbe Martens Olson & Bear LLP

(57) ABSTRACT

A system, method, and computer-readable medium for point of presence (POP) based traffic surge detection and mitigation are provided. The system detects a traffic surge for a target group of resources directed at a source POP based on the target group's rank shifts and volume changes among recent time intervals. The system mitigates the detected traffic surge by identifying destination POPs with spare capacity and routing at least a portion of incoming requests for the target group of resources to the destination POPs in accordance with their spare capacities.

20 Claims, 7 Drawing Sheets

(56) References Cited

U.S. PATENT DOCUMENTS

| | | |
|---|---|---|
| 5,974,454 A | 10/1999 | Apfel et al. |
| 5,991,306 A | 11/1999 | Burns et al. |
| 5,999,274 A | 12/1999 | Lee et al. |
| 6,016,512 A | 1/2000 | Huitema |
| 6,018,619 A | 1/2000 | Allard et al. |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,151,631 A | 11/2000 | Ansell et al. |
| 6,157,942 A | 12/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Mullins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,484,161 B1 | 11/2002 | Chipalkatti et al. |
| 6,493,765 B1 | 12/2002 | Cunningham et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,622,168 B1 | 9/2003 | Datta |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 7/2005 | Orbits et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 * | 11/2006 | Dilley .................. H04L 29/06 709/203 |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |

(56) References Cited

U.S. PATENT DOCUMENTS

| | | |
|---|---|---|
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton et al. |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,716 B2 * | 5/2008 | Dilley .................. H04L 29/06 709/203 |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,603,439 B2 * | 10/2009 | Dilley .................. H04L 29/06 709/203 |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |

(56) References Cited

U.S. PATENT DOCUMENTS

| | | |
|---|---|---|
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasuramanian et al. |
| 8,423,408 B1 | 4/2013 | Barnes et al. |
| 8,433,749 B2 | 4/2013 | Wee et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,949,459 B1 | 2/2015 | Scholl |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,219,686 B2 * | 12/2015 | Hilt .................. H04L 47/10 |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,681 B1 | 8/2016 | Richardson et al. |
| 9,407,699 B2 | 8/2016 | Sivasubramanian et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,554 B2 | 4/2017 | Marshall et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 * | 12/2001 | Garcia-Luna-Aceves  G06F 12/1483 |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |

(56) References Cited

U.S. PATENT DOCUMENTS

| | | |
|---|---|---|
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1* | 12/2003 | Dilley ............... H04L 29/06 709/214 |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |

(56) References Cited

U.S. PATENT DOCUMENTS

| | | |
|---|---|---|
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198334 A1 | 9/2005 | Farber et al. |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1* | 5/2006 | Liu .................. H04L 29/12066 709/245 |
| 2006/0120385 A1 | 6/2006 | Atchison et al. |
| 2006/0129665 A1 | 6/2006 | Toebes et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1* | 3/2007 | Dilley .................... H04L 29/06 709/223 |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |

(56) References Cited

U.S. PATENT DOCUMENTS

| | | |
|---|---|---|
| 2007/0233896 A1* | 10/2007 | Hilt .................. H04L 47/10 709/238 |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1* | 1/2008 | Bornstein .............. H04L 29/06 370/227 |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1* | 9/2008 | Dilley .................. H04L 29/06 709/223 |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |

(56) References Cited

U.S. PATENT DOCUMENTS

| | | |
|---|---|---|
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0036238 A1 | 2/2012 | Sundaram et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233522 A1 | 9/2012 | Barton et al. |
| 2012/0233668 A1 | 9/2012 | Leafe et al. |
| 2012/0254961 A1 | 10/2012 | Kim et al. |
| 2012/0257628 A1 | 10/2012 | Bu et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0263256 A1 | 10/2013 | Dickinson et al. |

(56) References Cited

U.S. PATENT DOCUMENTS

| | | |
|---|---|---|
| 2013/0268616 A1 | 10/2013 | Sakata et al. |
| 2013/0279335 A1 | 10/2013 | Ahmadi |
| 2013/0305046 A1 | 11/2013 | Mankovski et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0108672 A1 | 4/2014 | Ou et al. |
| 2014/0137111 A1 | 5/2014 | Dees et al. |
| 2014/0143320 A1 | 5/2014 | Sivasubramanian et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0257891 A1 | 9/2014 | Richardson et al. |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0006615 A1 | 1/2015 | Wainner et al. |
| 2015/0067171 A1 | 3/2015 | Yum |
| 2015/0081842 A1 | 3/2015 | Richardson et al. |
| 2015/0089621 A1 | 3/2015 | Khalid |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1 | 7/2015 | Petrov |
| 2015/0188994 A1 | 7/2015 | Marshall et al. |
| 2015/0189042 A1 | 7/2015 | Sun et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0249579 A1 | 9/2015 | Ellsworth et al. |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0041910 A1 | 2/2016 | Richardson et al. |
| 2016/0065475 A1* | 3/2016 | Hilt .................. H04L 47/10 709/235 |
| 2016/0065665 A1 | 3/2016 | Richardson et al. |
| 2016/0072720 A1 | 3/2016 | Richardson et al. |
| 2016/0104346 A1* | 4/2016 | Ovalle ............. G07F 17/3223 463/17 |
| 2016/0134492 A1 | 5/2016 | Ellsworth et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0308959 A1 | 10/2016 | Richardson et al. |
| 2017/0041428 A1 | 2/2017 | Katsev |
| 2017/0085495 A1 | 3/2017 | Richardson et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |

OTHER PUBLICATIONS

Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.

Kenshi, P., "Help File Library: Iptables Basics," Justlinux, retrieved Dec. 1, 2005, from http://www.justlinux.com/nhf/Security/Iptables_Basics.html, 4 pages.

Office Action in Japanese Application No. 2014-225580 dated Oct. 26, 2015.

Second Office Action in Chinese Application No. 201180046104.0 dated Sep. 29, 2015.

Office Action in Canadian Application No. 2816612 dated Nov. 3, 2015.

Sharif et al, "Secure In-VM Monitoring Using Hardware Virtualization", Microsoft, Oct. 2009 http://research.microsoft.com/pubs/153179/sim-ccs09.pdf; 11 pages.

Second Office Action in Chinese Application No. 201180053405.6 dated Dec. 4, 2015.

Office Action in European Application No. 07754164.7 dated Dec. 14, 2015.

Office Action in Japanese Application No. 2011-516466 dated May 30, 2016.

Office Action in Russian Application No. 2015114568 dated May 16, 2016.

(56) References Cited

OTHER PUBLICATIONS

Office Action in Chinese Application No. 201310537815.9 dated Jul. 5, 2016.
Office Action in European Application No. 09839809.2 dated Dec. 8, 2016.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Fifth Office Action in Chinese Application No. 200980111426.1 dated Aug. 14, 2015.
Office Action in Japanese Application No. 2014-225580 dated Oct. 3, 2016.
Partial Supplementary Search Report in European Application No. 09826977.2 dated Oct. 4, 2016.
Decision of Rejection in Chinese Application No. 201180046104.0 dated Oct. 17, 2016.
Office Action in Canadian Application No. 2816612 dated Oct. 7, 2016.
Office Action in Japanese Application No. 2011-502139 dated Aug. 17, 2015.
Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 dated Apr. 5, 2016 in 8 pages.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls,";login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in:

(56) References Cited

OTHER PUBLICATIONS

Communications Magazine, IEEE (vol. 38, Issue: 11 ); Date of Publication: Nov. 2000; pp. 78-84; IEEE Xplore.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.

Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117, I5 pages.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Xu et al., "Decision tree regression for soft classification of remote sensing data", Remote Sensing of Environment 97 (2005) pp. 322-336.

Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

Supplementary European Search Report in Application No. 09729072.0 2266064 dated Dec. 10, 2014.

First Singapore Written Opinion in Application No. 201006836-9, dated Oct. 12, 2011 in 12 pages.

Singapore Written Opinion in Application No. 201006836-9, dated Apr. 30, 2012 in 10 pages.

First Office Action in Chinese Application No. 200980111422.3 dated Apr. 13, 2012.

First Office Action in Japanese Application No. 2011-502138 dated Feb. 1, 2013.

Singapore Written Opinion in Application No. 201006837-7, dated Oct. 12, 2011 in 11 pages.

Supplementary European Search Report in Application No. 09727694.3 dated Jan. 30, 2012 in 6 pages.

Singapore Examination Report in Application No. 201006837-7 dated Mar. 16, 2012.

First Office Action in Chinese Application No. 200980111426.1 dated Feb. 16, 2013.

Second Office Action in Chinese Application No. 200980111426.1 dated Dec. 25, 2013.

Third Office Action in Chinese Application No. 200980111426.1 dated Jul. 7, 2014.

Fourth Office Action in Chinese Application No. 200980111426.1 dated Jan. 15, 2015.

First Office Action in Japanese Application No. 2011-502139 dated Nov. 5, 2013.

Decision of Rejection in Application No. 2011-502139 dated Jun. 30, 2014.

Singapore Written Opinion in Application No. 201006874-0, dated Oct. 12, 2011 in 10 pages.

First Office Action in Japanese Application No. 2011-502140 dated Dec. 7, 2012.

First Office Action in Chinese Application No. 200980119995.0 dated Jul. 6, 2012.

Second Office Action in Chinese Application No. 200980119995.0 dated Apr. 15, 2013.

Examination Report in Singapore Application No. 201006874-0 dated May 16, 2012.

Search Report for European Application No. 09839809.2 dated May 11, 2015.

Supplementary European Search Report in Application No. 09728756.9 dated Jan. 8, 2013.

First Office Action in Chinese Application No. 200980119993.1 dated Jul. 4, 2012.

Second Office Action in Chinese Application No. 200980119993.1 dated Mar. 12, 2013.

Third Office Action in Chinese Application No. 200980119993.1 dated Oct. 21, 2013.

First Office Action in Japanese Application No. 2011-503091 dated Nov. 18, 2013.

Search Report and Written Opinion issued in Singapore Application No. 201006873-2 dated Oct. 12, 2011.

First Office Action in Chinese Application No. 200980125551.8 dated Jul. 4, 2012.

First Office Action in Japanese Application No. 2011-516466 dated Mar. 6, 2013.

Second Office Action in Japanese Application No. 2011-516466 dated Mar. 17, 2014.

Decision of Refusal in Japanese Application No. 2011-516466 dated Jan. 16, 2015.

Office Action in Canadian Application No. 2726915 dated May 13, 2013.

First Office Action in Korean Application No. 10-2011-7002461 dated May 29, 2013.

First Office Action in Chinese Application No. 200980145872.4 dated Nov. 29, 2012.

First Office Action in Canadian Application No. 2741895 dated Feb. 25, 2013.

Second Office Action in Canadian Application No. 2741895 dated Oct. 21, 2013.

(56) References Cited

OTHER PUBLICATIONS

Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in Chinese Application No. 201310717573.1 dated Jul. 29, 2016.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 11767118.0 dated Feb. 3, 2017.
Supplementary Examination Report in Singapore Application No. 11201501987U dated May 17, 2017.
International Search Report and Written Opinion in PCT/US/2016/066848 dated May 1, 2017.

\* cited by examiner

TRAFFIC SURGE MANAGEMENT FOR POINTS OF PRESENCE

BACKGROUND

Generally described, computing devices and communication networks can be utilized to exchange information. In a common application, a computing device can request content from another computing device via the communication network. For example, a user at a personal computing device can utilize a software browser application to request a Web page or application from a server computing device via the Internet. In such embodiments, the user computing device can be referred to as a client computing device ("client") and the server computing device can be referred to as a content provider.

Content providers are generally motivated to provide requested content to client computing devices often with consideration of efficiency, reliability, and/or cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages or resources identified in Web pages, through the utilization of a content delivery network ("CDN") service provider. A CDN service provider typically maintains a number of computing devices, generally referred to as "points of presence" or "POPs" in a communication network. The service provider or POPs can include one or more domain name service ("DNS") computing devices that can process DNS queries from client computing devices. Additionally, the POPs can include network resource storage component that maintain content from various content providers. In turn, content providers can instruct, or otherwise suggest to, client computing devices to request some, or all, of a content provider's content from the CDN service provider's computing devices. As with content providers, CDN service providers are also generally motivated to provide requested content to client computing devices often with consideration of efficiency, reliability, and/or cost associated with the transmission of the content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
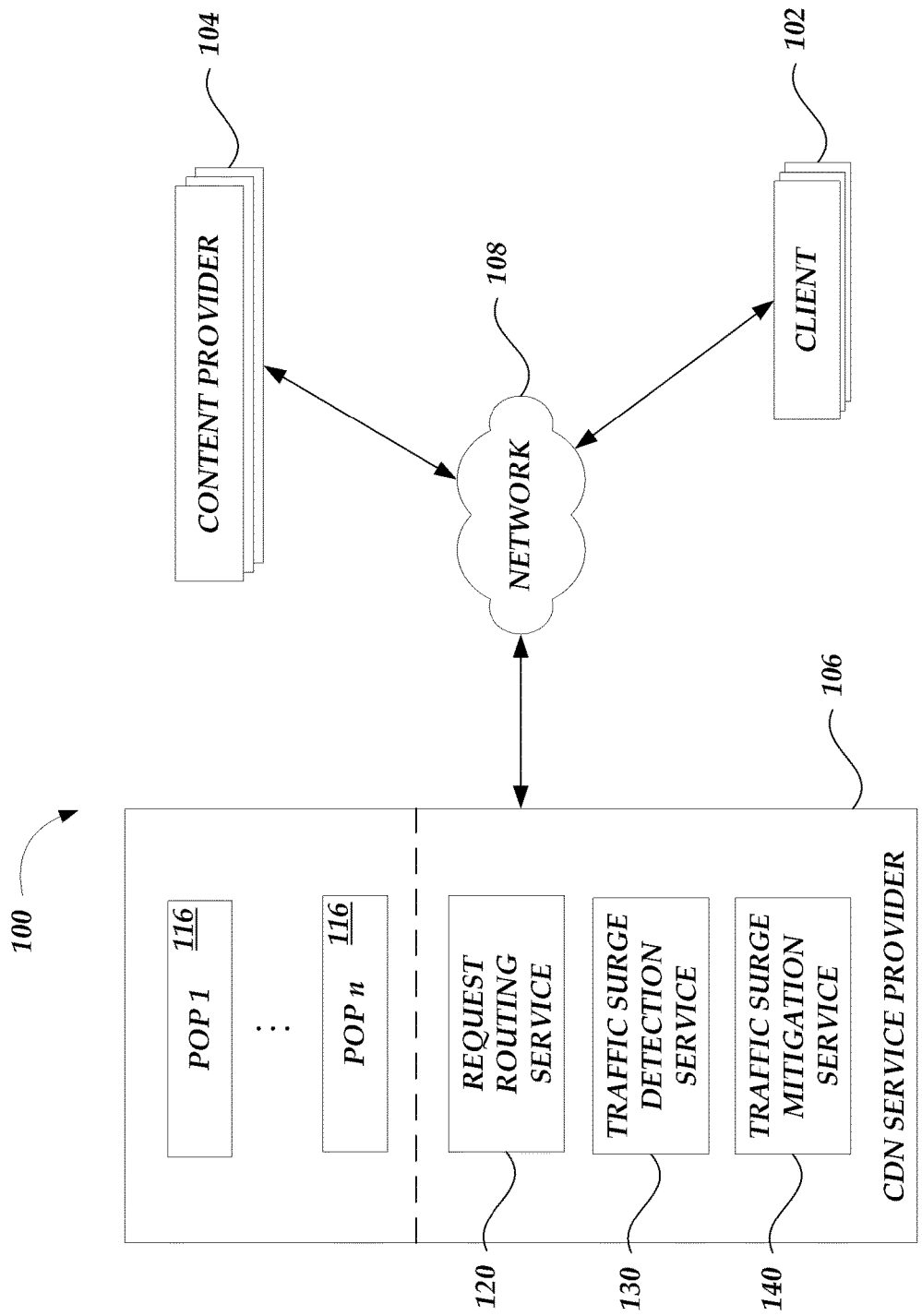
FIG. 1 is a block diagram illustrative of a content delivery environment including a number of client computing devices, a number of content providers, and a content delivery service provider.

Generally described, the present disclosure is directed to the management and routing of requests from client computing device for network resources. Specifically, aspects of the disclosure will be described with regard to detection of a traffic surge for network resources at points of presence (POPs), based on analyses of current and previous content request volume data. Additionally, aspects of the disclosure will be described with regard to mitigation of a traffic surge via content request routing to multiple POPs, based on traffic surge data and POP capacity information. Illustratively, a traffic surge may correspond to an unexpected and massive surge in volume of requests received at a POP for a target group of network resources. For example, one type of traffic surge may correspond to flash crowd traffic, such as where a Web site suddenly catches the attention of a large number of users. Illustratively, this may occur concurrently with reports of breaking news, releases of revolutionary products, openings of popular events, etc., when relevant Web sites may see abrupt surge in traffic. A traffic surge may include legitimate user requests as well as malicious attacks, and may cause slow down or temporary unavailability of content serving functionalities or devices, and therefore should be detected and mitigated. In particular, a traffic surge should not adversely affect the experience of users who do not contribute to the traffic surge (e.g., users who are not requesting any resource of the target group).

In accordance with an illustrative embodiment, a content delivery network (CDN) service provider receives content requests for network resources associated with various content providers. Each content provider may set up groups of network resources (e.g., corresponding to Web pages, Web applications, Web sites, or portions thereof) that the CDN service provider may assist in content delivery. The CDN service provider may include a request routing service for routing incoming content requests to appropriate POPs for processing. For example, in response to a DNS query corresponding to a requested resource, a CDN service provider may select a POP to serve the resource request based on a geographic proximity between the POP and the requesting client device.

At regular time intervals (e.g., every minute), a traffic surge detection service of the CDN service provider obtains data regarding request volumes for various groups of resources received at each POP during a most recent period of time (e.g., the minute that just passed). The data may be a list of resource groups ordered by their associated request volume during the most recent period of time. Based on the request volume data corresponding to temporally ordered time periods, the traffic surge detection service may determine resource groups that begin to receive a traffic surge at any POP in substantially real time. In addition, the traffic surge detection service may obtain data indicating the magnitude, or rate, of change in volume of requests for a resource group. For example, this data may indicate that a certain resource group experienced a spike in requests in a 10 second span that exceeds a certain threshold (e.g, a percentage) of the normal request fluctuations. This could also indicate that, while it may not be problematic for requests to spike from 10 requests to 50 requests in a matter of five minutes, that same increase in requests over five seconds may be indicative of a traffic surge.

For example, for each POP, the traffic surge detection service may identify a resource group that is ranked within the top 10 groups by request volume for the most recent time period. The ranking may also take into account and be based upon the rate of change of resource groups. The traffic surge detection service may then determine whether the identified group also appears within the top 10 groups by request volume during a specified number of time periods prior to the most recent time period. If the identified resource group is not one of the top 10 requested groups for any prior time periods, the traffic surge detection service may label the identified resource group as a candidate group for further determination.

For the candidate group, the traffic surge detection service determines a shift in its rank by request volume as between prior time periods and the most recent time period. The traffic surge detection service may further determine a magnitude of change in request volume for the candidate group between prior time periods and the most recent time period, or the rate of change in request volume over a particular time period or a particular set of time periods. Applying predetermined or dynamically generated thresholds to the change of rank and/or magnitude in terms of request volume, the traffic surge detection service may determine that the candidate group is currently receiving a traffic surge. The traffic surge detection service may then generate a traffic surge alert including information about the affected POP, the identified group of resources, the most recent request volume corresponding to the group, etc.

The traffic surge alert may be provided to a traffic surge mitigation service of the CDN service provider so that the traffic surge can be mitigated. The traffic surge mitigation service may constantly estimate current spare capacities of individual POPs for processing content requests. Illustratively, at regular time intervals (e.g., every minute), each POP may provide data regarding a total volume of requests that are processed by the POP during the most recent period of time. The estimated spare capacity may correspond to a difference between a maximum quantity of content requests that can be processed by the POP (e.g., as limited by its networking or computational capacity) and the total volume of requests processed during the most recent period of time.

Upon receipt of a traffic surge alert for a source POP that identifies a target resource group as receiving a traffic surge, the traffic surge mitigation service determines whether the source POP may absorb the surged traffic based on its estimated spare capacity. If not, the traffic surge mitigation service attempts to identify one or more destination POPs to spread the surged traffic. The traffic surge mitigation service may identify a list of destination POPs based on a combination of factors, such as their corresponding estimated spare capacity, geographic or network-based proximity to the source POP or clients generating the traffic surge, groups of resources currently being served, latency, bandwidth, other POP performance factors, combination of the same, or the like.

The traffic surge mitigation service may distribute the traffic surge request volume, as reported in the traffic surge alert, across the source POP and a sufficient number of identified destination POPs based on their corresponding estimated spare capacities. The traffic surge mitigation service may then calculate a corresponding routing weight for each of the source and destination POPs that will serve future traffic, based on their respective proportions of the traffic surge request volume as distributed. The traffic surge mitigation service may then cause modification of a routing policy or mechanism, which can be implemented by the routing service of the CDN service provider, for routing incoming requests for network resources corresponding to the target group, in accordance with the calculated routing weights. For example, the modified routing policy may enable the routing service to probabilistically route any incoming requests for the target group received during the next period of time to the source POP or one of the destination POPs based on their respective routing weights.

The traffic surge mitigation service continues to monitor the request volumes for the target group received at the source and destination POPs as incoming traffic is routed during subsequent time periods. In doing so, the traffic surge mitigation service may calculate an aggregate request volume for the target group based on respective volumes received at each applicable POP. For each of the subsequent time periods, the traffic surge mitigation service may adjust the routing weights, adding or removing destination POPs, or otherwise modifying the routing policy or mechanism in response to changes in the aggregate request volume for the target group. If the aggregate request volume returns to a level manageable by the source POP alone (e.g., within a threshold of an average request volume for a number of time periods prior to the detection of traffic surge), the traffic surge mitigation service may terminate the mitigation process and cause the routing service to resume its usual routing functionalities with respect to incoming traffic for the target group.

Although various aspects of the disclosure will be described with regard to illustrative examples and embodiments, one skilled in the art will appreciate that the disclosed embodiments and examples should not be construed as limiting. For example, although aspects of the disclosure will be described with regard to specific service providers such as a CDN service provider, one skilled in the relevant art will appreciate that aspects of the disclosure may be implemented by various types of service providers or that a service provider implementing aspects of the disclosure is not required to have the specific components utilized in the illustrative examples.

FIG. 1 is a block diagram illustrative of content delivery environment 100 for the management and processing of content requests. As illustrated in FIG. 1, the content delivery environment 100 includes a number of client computing devices 102 ("clients") for requesting content from a content provider and/or a CDN service provider. In an illustrative embodiment, the clients 102 can correspond to a wide variety of computing devices including personal computing devices, laptop computing devices, hand-held computing devices, terminal computing devices, mobile devices, wireless devices, various electronic devices and appliances and the like.

In an illustrative embodiment, the clients 102 include necessary hardware and software components for establishing communications over a communication network 108. For example, the client computing devices 102 may be equipped with networking equipment and browser software applications that facilitate communications via the communication network 108. The network 108 can be a publicly accessible network of linked networks, possibly operated by various distinct parties, such as the Internet. In other embodiments, the network 108 may include a private network, personal area network ("PAN"), LAN, WAN, cable network, satellite network, any other medium of computer data transfer, or some combination thereof.

The clients 102 may also include necessary hardware and software components for requesting content from network entities in the form of an originally requested resource that may include identifiers to two or more embedded resources that need to be requested. Further, the clients 102 may include or be associated with necessary hardware and software components, such as browser software applications, plugins, scripts, etc., for fulfilling the original resource request and each embedded resource request. In other embodiments, the client computing devices 102 may be otherwise associated with an external proxy application or device, as well as any other additional software applications or software services, used in conjunction with requests for content.

Although not illustrated in FIG. 1, each client 102 may utilize some type of DNS resolver component, that generates DNS queries attributed to the client computing device. In one embodiment, the DNS resolver component may be provided by an enterprise network to which the client 102 belongs. In another embodiment, the DNS resolver component may be provided by an Internet Service Provider (ISP) that provides the communication network connection to the client 102.

The content delivery environment 100 also includes one or more content providers 104 in communication with the clients 102 via the communication network 108. The content provider 104 illustrated in FIG. 1 corresponds to a logical association of one or more computing devices associated with a content provider. Specifically, the content provider 104 can include one or more server computing devices for obtaining and processing requests for content (such as Web pages) from the clients 102. The content provider 104 can further include one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like.

With continued reference to FIG. 1, the content delivery environment 100 further includes a CDN service provider 106 in communication with the clients 102 and the content providers 104 via the communication network 108. The CDN service provider 106 illustrated in FIG. 1 corresponds to a logical association of one or more computing devices associated with a CDN service provider. Specifically, the CDN service provider 106 can include a number of points of presence ("POP") locations 116 that correspond to nodes on the communication network 108. Each POP 116 may include a number of DNS server computing devices for resolving DNS queries from the clients 102. Each POP 116 may also include a number of cache server computing devices for storing resources from content providers and transmitting various requested resources to various client computers. Further, although the POPs 116 are illustrated in FIG. 1 as logically associated with the CDN service provider 106, the POPs can be geographically distributed throughout the communication network 108 to serve the various demographics of clients 102. Additionally, one skilled in the relevant art will appreciate that the CDN service provider 106 can be associated with various additional computing resources, such additional computing devices for administration of content and resources, and the like.

The CDN service provider 106 can include a request routing service 120 for routing content requests to various POPs 116 for processing, a traffic surge detection service 130 for detecting traffic surges for each POP 116, and a traffic surge mitigation service 140 for determining traffic surge mitigation strategies. For example, the request routing service 120 may include or otherwise be associated with a number of DNS server computing devices for resolving DNS queries from the clients 102. The DNS server computing devices associated with the request routing service 120 may or may not include DNS devices associated with individual POPs 116. Illustratively, the request routing service 102 may implement various routing policies or mechanisms to facilitate the traffic surge detection and mitigation functionalities disclosed herein.

The traffic surge detection service 130 can implement various computational, statistical, or machine learning methods to detect traffic surges based on volumes of content requests received at individual POPs 116 for various groups of network resources. Illustratively, the traffic surge detection service 130 may obtain request volume data corresponding to consecutive time intervals from the POPs 116. The traffic surge detection service 130 may identify resource groups corresponding to high request volumes and compare their rankings in terms of request volume across a number of recent and/or historical time intervals. The traffic surge detection service 130 may also compare changes in the magnitude of request volumes across time intervals for the highly requested resource groups. The traffic surge detection service 130 may conduct these comparisons with predetermined or dynamically generated thresholds or criteria, and determine resource groups that are considered targets of a traffic surge for each POP 116.

In some embodiments, the traffic surge detection service 130 may detect traffic surges based on rate of change in traffic volume. Illustratively, the traffic surge detection service 130 may estimate first and/or second derivatives of request volume as a function of time, based on the traffic volumes as sampled from each time period. The traffic surge detection service 130 may determine whether the estimated first and/or second derivatives exceeds predetermined thresholds for a recent time. As another example, the traffic surge detection service 130 may compute a correlation coefficient between request volume and time (or time periods) over request volumes reported in a number of recent time periods, and determine whether the coefficient exceeds certain threshold. These methods can be used independently or in conjunction with other analysis and comparisons as described above.

The traffic surge mitigation service 140 can implement various computational methods for developing traffic surge mitigation strategies. Illustratively, the traffic surge mitigation service 140 may estimate current or future spare capacities of various POPs 116 for processing content requests, determine whether a source POP has capacity to absorb detected traffic surge, or identify destination POPs that may be suitable for handling at least a portion of the surged traffic. Additionally, the traffic surge mitigation service 140 may create or update request routing policies implemented by the request routing service 120, for routing future requests for any target resource groups receiving a traffic surge in accordance with determined mitigation strategies.

Further, these modules or components may include additional components, systems, and subsystems for facilitating the methods and processes. In various embodiments, reference to the request routing service 120, the traffic surge detection service 130, or the traffic surge mitigation service 140 may include multiple computing devices working in conjunction to facilitate the functionalities disclosed herein. For example, in various embodiments, the services may be distributed through a network or implemented by one or more virtual machine instances. Additionally or alternatively, the request routing service 120, the traffic surge detection service 130, or the traffic surge mitigation service 140 may be centralized in one computing device, and/or be distributed across several computing devices.

Figure 2:
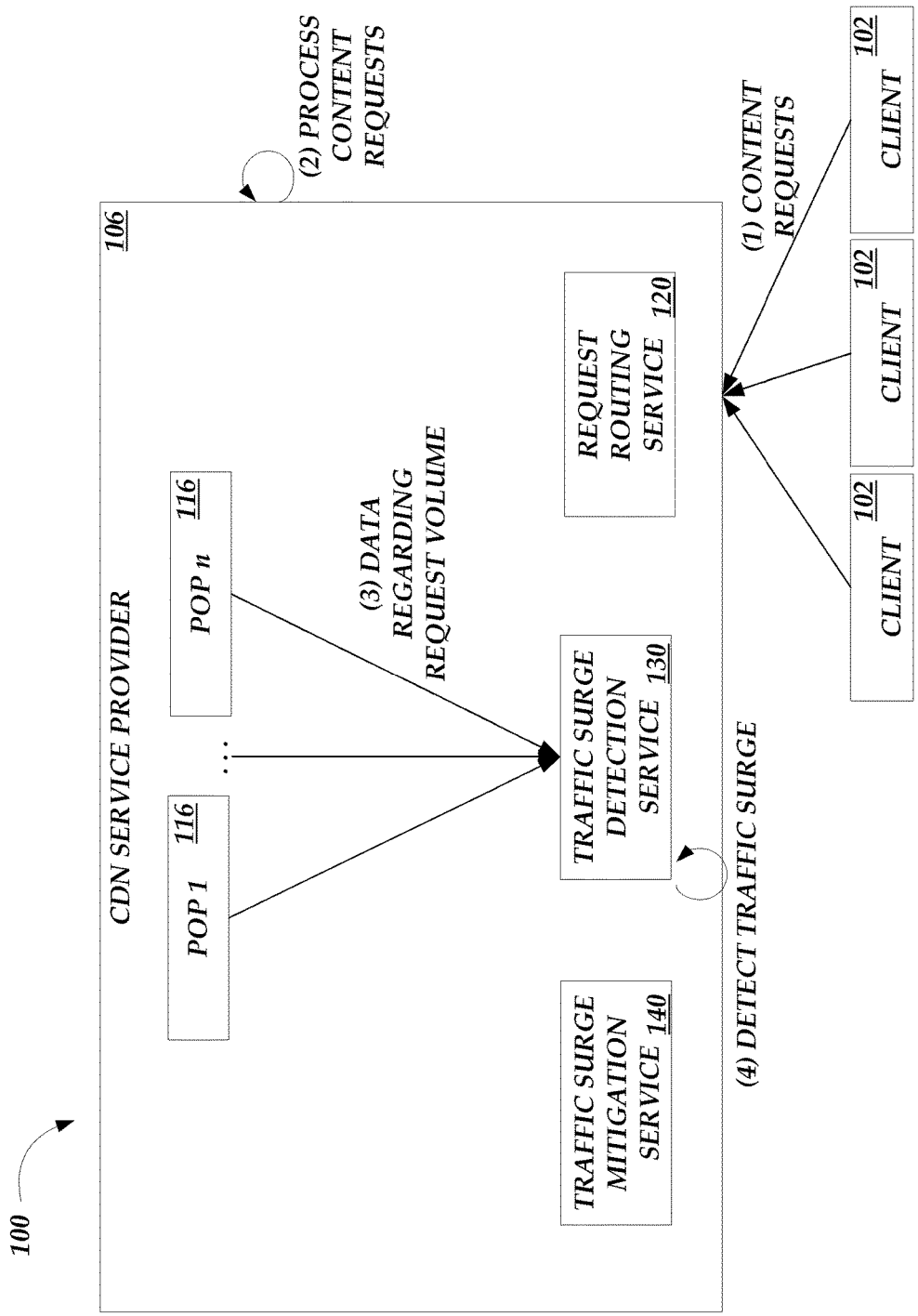
FIG. 2 is a block diagram of the content delivery environment of FIG. 1 illustrating the detection of a traffic surge for network resources.
Figure 3:
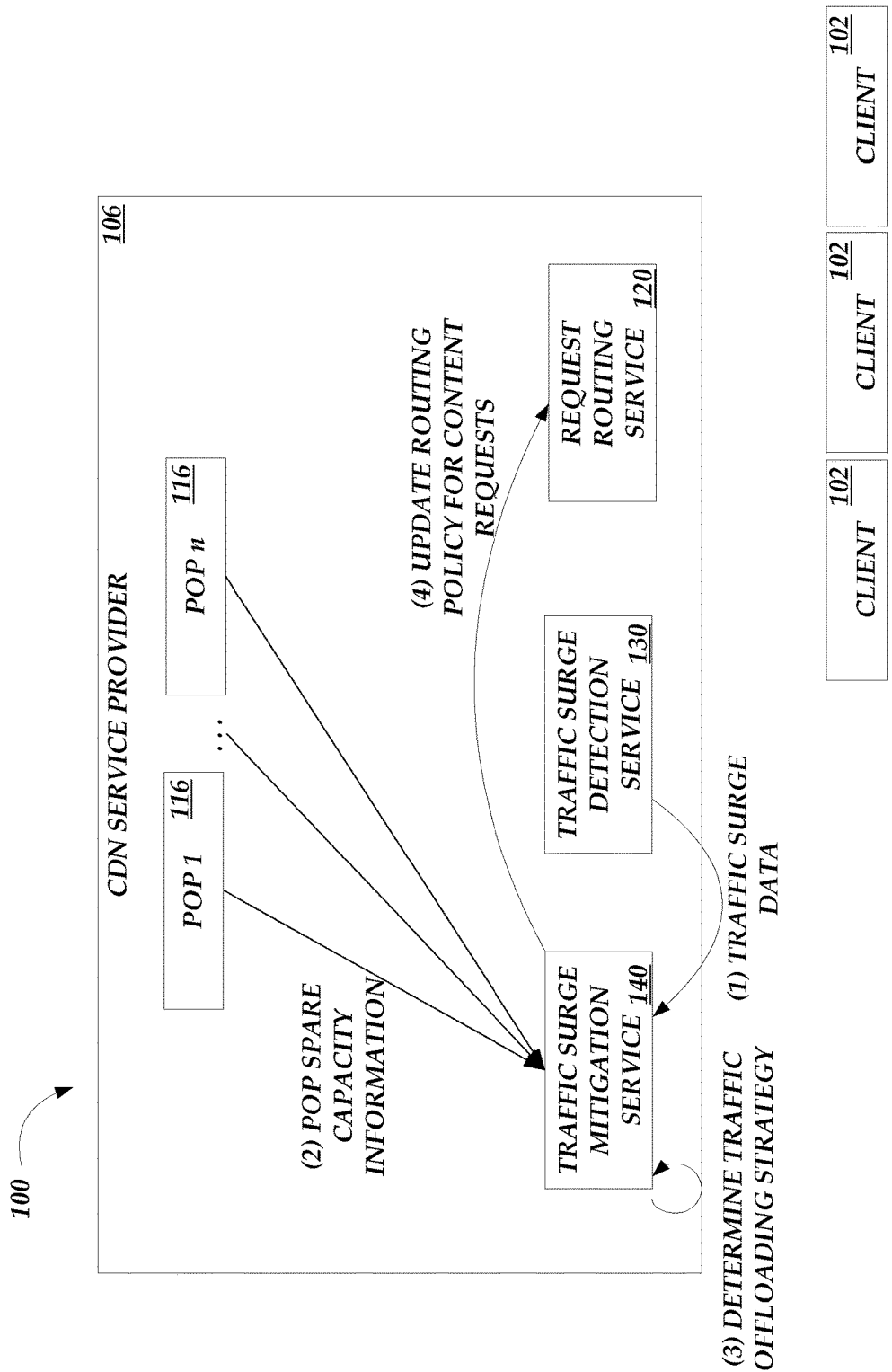
FIG. 3 is a block diagram of the content delivery environment of FIG. 1 illustrating the mitigation of a traffic surge for network resources.

With reference now to FIG. 2 and FIG. 3, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 2 is a block diagram of the data communication environment 100 of FIG. 1 illustrating the detection of a traffic surge for network resources. As illustrated in FIG. 2, at (1), one or more clients 102 transmit content requests to the CDN service provider 106 for network resources associated with various content providers. As described above, the network resources may correspond to different groups in accordance with their corresponding criteria. For example, each content provider may define one or more groups of network resources (e.g., as corresponding to Web pages, Web applications, Web sites, or portions thereof) that the CDN service provider may assist in delivering to clients 102.

In accordance with an illustrative embodiment, a content request may include a DNS query for a resource's uniform resource locator (URL). After resolution of the DNS query, a content retrieval request may follow accordingly, based on common network protocols, such as the hypertext transfer protocol ("HTTP"). The URLs for requested network resources may indicate or otherwise provide information for the CDN service provider 106 to correlate each content request to a specific group of network resources. For example, the URL may include a designation of domain or subdomain, which corresponds to an identification of one of the network resource groups defined by various content providers 104. In some embodiments, the content requests may not be directly transmitted from clients 102 to the CDN service provider 106. For example, there may be one or more intermediate entities, such as DNS resolvers or proxy devices, between the clients 102 and the CDN service provider 106.

At (2), the CDN service provider 106 processes the content requests. In some embodiments, the content requests are received at the request routing service 120. The request routing service 120 may route each request to an appropriate POP 116 in accordance with existing routing policies. For example, the request routing service 120 may resolve DNS queries by replying to the queries with network routing information, such as Internet Protocol (IP) addresses, for the selected POPs 116. The selection of a POP to serve the request can be based on a network-based proximity between the POP and the requesting client 102 or an intermediate entity. Following the routing, individual POPs 116 may receive content requests directed thereto. In other embodiments, the request routing service 120 is implemented in a distributed fashion at individual POPs 116. In these embodiments, certain content requests received at one POP may or may not be routed to another POP.

At (3), each POP 116 generates data regarding request volume (e.g., a total number of requests during a certain period of time) received at the POP for various groups of network resources, and transmits the request volume data to the traffic surge detection service 130 or to a data repository that the traffic surge detection service 130 has access to. The data can be transmitted at regular time intervals (e.g., every 10 seconds), upon request by the traffic surge detection service 130, or based on the occurrence of triggering events. Illustratively, the data may be a list of resource groups associated with their respective request volume during a most recent period of time (e.g., the 30 seconds that just passed). The time periods for each round of request volume can be consecutive, disjoint, or overlapping. For example, request volumes can be calculated on a 60-second basis while the data generation and transmission can be performed every 30 seconds, that is, there can be an underlying 30-second overlap of time between the request volume data of any two consecutive data transmissions. As described above, rate of changes within a time period of among several time periods can be calculated as well.

The number of resource groups included in the transmitted data may be predetermined. For example, the data may include a set of top 50 groups of resources as measured by their respective request volume. Alternatively or in addition, the number of resource groups included in the data may be dynamically determined. For example, only those groups associated with request volumes, or request volume rates of change, higher than a threshold value will be included. In some embodiments, the data includes any and all resource groups that a respective POP 116 has assisted in content delivery during the most recent period of time.

At (4), the traffic surge detection service 130 detects a traffic surge based on the request volume data for various groups of network resources. In some embodiments, the traffic surge detection service 130 may analyze the request volume data for each POP 116 individually. For example, the traffic surge detection service 130 may parse the request volume data of a POP and identify 10 resource groups (e.g., corresponding to 10 different Web pages) that are associated with the highest 10 request volumes received at the POP for the most recent time period. The traffic surge detection service 130 may then determine whether any of the identified 10 groups was not associated with a sufficiently high request volume in a number of time periods prior to the most recent time period. Illustratively, this can be achieved by comparing the identified 10 resource groups against a specified number (e.g., an integer equal to or greater than 10) of top groups as ranked by request volume during previous time periods. In some embodiments, the ranking of groups can be based on their respective rate of change in request volumes, which can be estimated or calculated based on methods described above or known in relevant technical fields.

If all identified resource groups consistently appear within the top ranks for a number of previous time periods, they are not considered traffic surge targets because there is no abrupt surge of request volume. If an identified resource group is not one of the top requested groups for some previous time periods, the traffic surge detection service 130 may label the identified resource group as a candidate group for further determination. For the candidate group, the traffic surge detection service 130 may determine a shift in its rank by request volume as between one or more previous time periods and the most recent time period. If the shift in rank exceeds a threshold measure, the identified resource group may be considered a target receiving a traffic surge.

Alternatively or in addition, the traffic surge detection service 130 may determine a magnitude of change in request volume for the candidate group between previous time periods and the most recent time period. For example, the traffic surge detection service 130 may calculate a difference or ratio between a request volume of the most recent time period and an average request volume of a specified number of previous time periods. Applying a predetermined or dynamically generated threshold to the calculated difference or ratio, the traffic surge detection service 130 may determine that the candidate group is currently receiving a traffic surge.

The traffic surge detection service 130 may then generate a traffic surge alert including information about the affected POP, the identified group of resources, the most recent request volume corresponding to the group, etc. The generated traffic surge alerts can be transmitted to the traffic surge mitigation service 140, another service, or a system administrator for further processing.

FIG. 3 is a block diagram of the content delivery environment 100 of FIG. 1 illustrating the mitigation of a traffic surge for network resources. As illustrated in FIG. 3, at (1), the traffic surge detection service 130 provides traffic surge data to the traffic surge mitigation service 140. The traffic surge data may include the traffic surge alerts generated by traffic surge detection service 130 as well as any associated metadata, such as information regarding the underlying time periods for determining a traffic surge. In some embodiments, the traffic surge data may be transmitted directly between the services. In other embodiments, the traffic surge data can be maintained by a database or data store accessible to the traffic surge mitigation service 140.

At (2), the traffic surge mitigation service 140 obtains information related to determining spare capacity of individual POPs 116 for processing content requests for various groups of network resources. Illustratively, at regular time intervals (e.g., every 10 seconds), each POP 116 may transmit or otherwise provide data regarding a total volume of requests processed by the POP during the most recent period of time to the traffic surge mitigation service 140. Again, the length of the time interval between two consecutive reports of request volumes may or may not be the same as the time period that serves as basis for calculating the request volumes. Each POP 116 may also provide the traffic surge mitigation service 140 information about content currently being served by the POP 116, current maximum capacity of the POP 116 for serving certain types of content requests, latency, bandwidth, or other performance metrics associated with the POP 116. In some embodiments, another intermediary service or system collects necessary information from individual POPs 116, calculates or estimates spare capacities of the POPs for processing content requests of various groups, and provides the spare capacity information to the traffic surge mitigation service 140 at regular or varied time intervals or upon request.

At (3), for each traffic surge alert that identifies a target resource group as receiving a traffic surge at a source POP 116, the traffic surge mitigation service 140 determines whether the source POP may absorb the traffic surge without adversely affecting its performance. Illustratively, the traffic surge mitigation service 140 may estimate a current spare capacity of a POP 116 for processing requests for the target resource group based on the information obtained at (2). For example, the estimated spare capacity may correspond to a difference between a maximum quantity of content requests that can be processed by the POP 116 (e.g., as limited by its networking or computational capacity) during a future time period and the total volume of requests processed during the most recent period of time. In some embodiments, a cushion capacity (e.g., 10% of the maximum request processing capacity) is reserved for each POP 116 and will be carved out of the estimation. In other words, the maximum capacity may be reduced by the cushion capacity for purposes of estimating the spare capacity.

If the traffic surge mitigation service 140 determines that the source POP 116 does not have sufficient spare capacity to absorb the traffic surge traffic, for example, by comparing its estimated spare capacity against the traffic surge request volume as reported in the traffic surge alert, the traffic surge mitigation service 140 starts identifying one or more destination POPs 116 to spread the surged traffic. The traffic surge mitigation service 140 may identify a list of destination POPs based on a combination of factors, such as their corresponding estimated spare capacity, geographic or network-based proximity to the source POP or clients generating the traffic surge, groups of resources currently being served, latency, bandwidth or POP performance factors, etc. For example, the traffic surge mitigation service 140 may sort a set of POPs 116 based on their geographic distances to the source POP 116 and identify from the set a number of destination POPs 116 that are closest to the source POP 116. The traffic surge mitigation service 140 may also confirm that an aggregate of the estimated spare capacity of the identified destination POPs 116 (when combined with that of the source POP, in some embodiments) are sufficient to handle the traffic surge request volume as reported in the traffic surge alert.

The traffic surge mitigation service 140 may then calculate a corresponding routing weight for each of the source and destination POPs, based on their corresponding estimated spare capacity to process requests for the target group of traffic surge. In some embodiments, the routing weight may further depend on associated latency, bandwidth, estimated timing of peak or non-peak load, or other POP performance factors. The traffic surge mitigation service 140 may then determine a policy or mechanism for routing incoming content requests for network resources corresponding to the target group, in accordance with the calculated routing weights. In some embodiments, the modified routing policy may correspond to a deterministic temporal order of the source POP and the destination POPs that conforms to their routing weights distribution (e.g., always route a first 4 incoming requests to the source POP, the next 2 requests to destination POP 1, . . . , the next 3 requests to destination POP n, and repeat the sequence). In other embodiments, the modified routing policy may correspond to a probabilistic or otherwise randomized decision scheme, where a resource request is more likely to be routed to a POP associated with a larger routing weight.

At (4), the traffic surge mitigation service 140 may communicate the determined routing policy to the routing service 120 or otherwise causing the routing service 120 to update routing policies or mechanisms accordingly. This enables the routing service 120, for a future period of time, to route incoming requests for the target group in accordance with the determined routing policy. Thereafter, the traffic surge mitigation service 140 determines updated routing policies based on new estimates of spare capacities associated with the source and/or destination POPs as described above. This process can be repeated at specified time intervals (e.g., every minute) until no more traffic surge alerts for the target resource group is generated for the source POP. In some embodiments, when a destination POP is selected and starts receiving a portion of surged traffic offloaded from the source POP, traffic surge alerts with respect to the same target group may be generated for the destination POP. In these embodiments, the traffic surge mitigation service 140 may disregard the traffic surge alerts for the target group generated by the destination POPs until the offloading ends.

Figure 4:
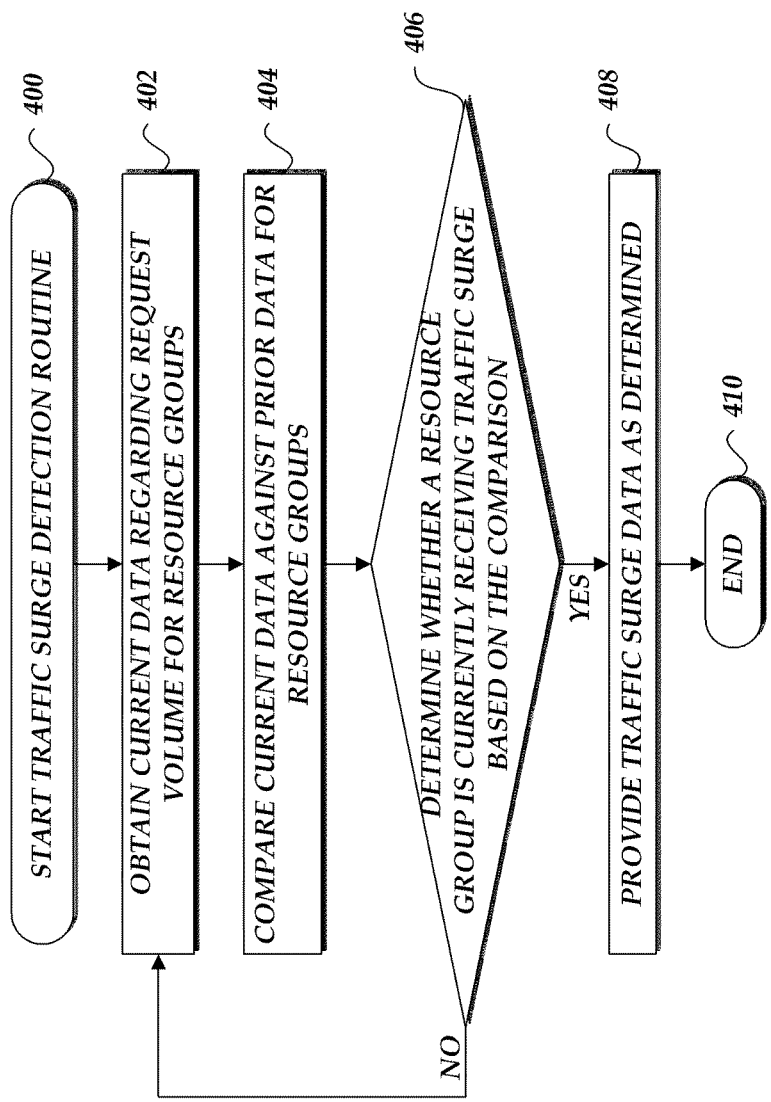
FIG. 4 is a flowchart illustrative of a traffic surge detection routine implemented by a content delivery network service provider.

FIG. 4 is a flowchart illustrative of a traffic surge detection routine implemented by a CDN service provider 106. The routine starts at block 400. At block 402, the CDN service provider 104 obtains current data regarding request volume for network resource groups from each POP 116. Illustratively, the data can be transmitted from each POP 116 to the CDN service provider 106 at regular time intervals (e.g., every minute), upon request by the traffic surge detection service 130, or based on the occurrence of triggering events. The data may be a list of resource groups associated with their respective request volume during a most recent period of time (e.g., the 30 seconds that just passed). As describe above, the time periods for each round of request volume can be consecutive, disjoint, or overlapping.

At block 404, the CDN service provider 106 compares current volume data against prior volume data received from any specific POP 116. For example, the CDN service provider 106 may identify all resource groups that are ranked (e.g., by request volume) higher than a pre-determined first threshold position in the list of resource groups or account for a respective volume higher than can be processed by a certain proportion or percentage of the specific POP's processing capacity, in the most recent time period. The CDN service provider 106 may then determine whether any of the identified groups is ranked below a second threshold position, in some time period(s) prior to the most recent time period. In some embodiments, the second threshold position may be determined based on the identified group's ranking in the most recent time period. For example, the second threshold position may be a function of the identified group's rank in the most recent time period, such as a multiple of the rank value plus a constant offset number.

As described above, in some embodiments, the CDN service provider 106 may detect traffic surges based on rate of change in traffic volume. Illustratively, the CDN service provider 106 may estimate first and/or second derivatives of request volume as a function of time, based on the volumes as sampled from each time period. The CDN service provider 106 may determine whether the estimated first or second derivative exceeds a predetermined threshold for a recent time. As another example, the CDN service provider 106 may compute a correlation coefficient between request volume and time (or time periods) over request volumes reported in a number of recent time periods, and determine whether the coefficient exceeds certain threshold. These methods can be applied independently or in conjunction with other analysis and comparisons as described above.

At block 406, the CDN service provider 106 determines whether a resource group is currently receiving a traffic surge based on the comparison. As described above, if all identified resource groups consistently appear within the top ranks for a number of previous time periods, the resource groups are not considered traffic surge targets because there is no abrupt surge of request volume. If an identified resource group is not one of the top requested groups in some previous time periods (e.g., based on the second threshold positions), the CDN service provider 106 may label the identified resource group as a candidate group for further determination. For the candidate group, the CDN service provider 106 may determine a value change between a function of its ranks (e.g., a weighted average) in multiple previous time periods and its rank in the most recent time period. If the change exceeds a threshold measure, which can be predetermined or dynamically calculated based on any previous or current rank of the candidate group, the candidate group may be considered a target receiving a traffic surge.

Alternatively or in addition, the CDN service provider 106 may determine a magnitude of change in request volume for the candidate group between previous time periods and the most recent time period. For example, the traffic surge detection service 130 may calculate a difference or ratio between a request volume of the most recent time period and a weighted average of request volumes for some previous time periods. Similar to how the rankings may be utilized mathematically, predetermined or dynamically generated thresholds can be applied to the calculated difference or ratio, and the CDN service provider 106 may determine whether the candidate group is receiving a traffic surge. If the CDN service provider 106 determines that the identified resource group is receiving a traffic surge, the routine of FIG. 4 proceeds to block 408. Otherwise, the routine returns to block 402, where more recent data regarding request volume is obtained.

If the routine proceeds to block 408, the CDN service provider 106 provides traffic surge data as determined. The CDN service provider 106 may generate a traffic surge alert including information about the affected POP, the identified group of resources, the most recent request volume corresponding to the group, etc. The traffic surge data can be utilized by the CDN service provider 106, another service, or a system administrator for purposes of mitigating traffic surge. The routine of FIG. 4 ends at block 410.

Figure 5:
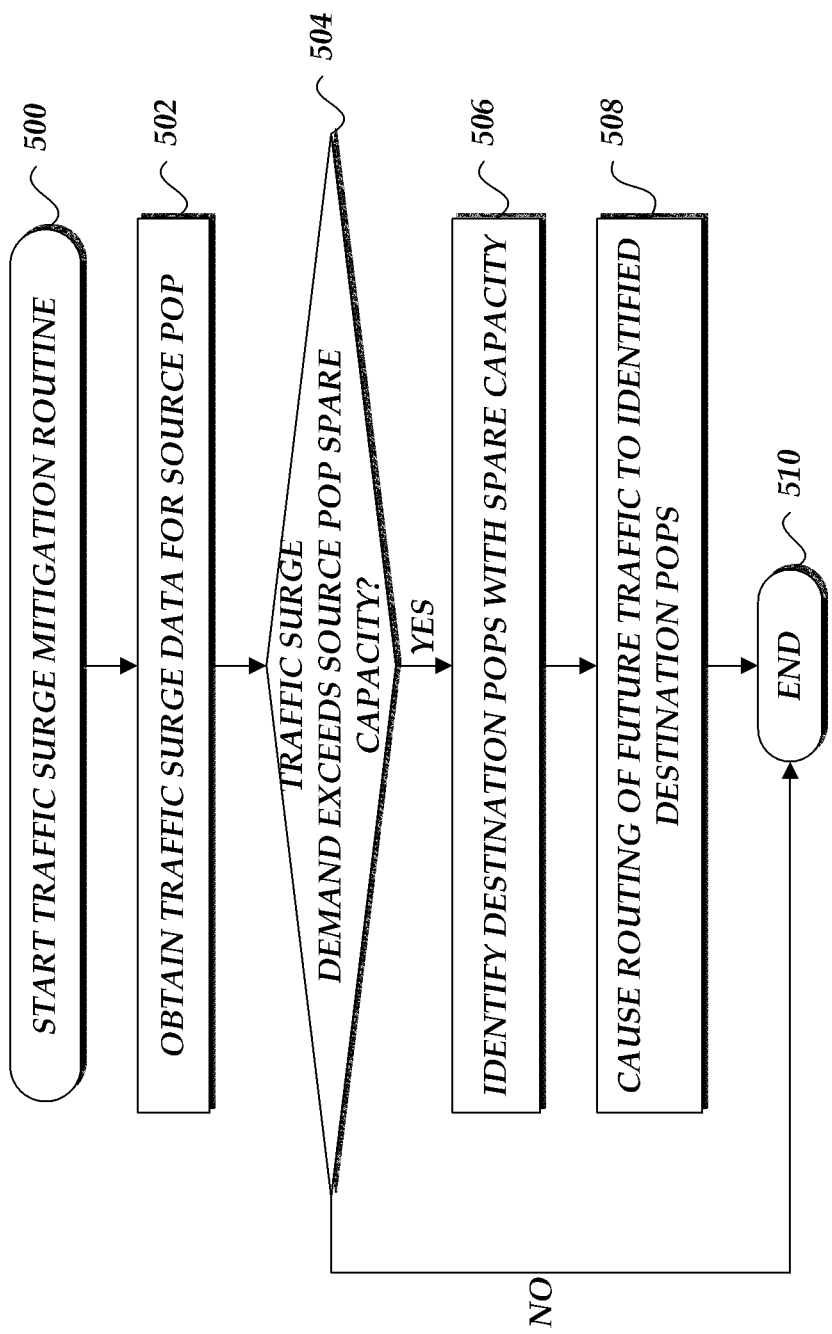
FIG. 5 is a flowchart illustrative of a traffic surge mitigation routine implemented by a content delivery network service provider.

FIG. 5 is a flowchart illustrative of a traffic surge mitigation routine implemented by a CDN service provider 106. The routine starts at block 500. At block 502, the CDN service provider 106 obtains traffic surge data for a source POP 116. The traffic surge data may include the traffic surge alerts generated by the CDN service provider 106 as well as any associated metadata, such as information regarding the underlying time periods for determining a traffic surge.

At block 504, the CDN service provider 106 determines whether a surged demand for target network resource group as indicated in the traffic surge data exceeds a spare capacity of the source POP 116. Illustratively, the CDN service provider 106 may estimate a current spare capacity of a POP 116 based on a maximum capacity of the POP for processing requests and a total volume of requests currently processed by the POP. For example, the estimated spare capacity may correspond to a difference between a maximum quantity of content requests that can be processed by the POP 116 (e.g., as limited by its networking or computational capacity) during a future time period and a total volume of requests processed at the POP during the most recent period of time. As described above, in some embodiments, a cushion capacity is reserved for each POP 116 and will reduce the maximum capacity for purposes of spare capacity estimation.

If the CDN service provider 106 determines that the source POP 116 has sufficient spare capacity to absorb the traffic surge (e.g., its estimated spare capacity exceeds the traffic surge request volume as reported in the traffic surge alert by a predetermined threshold measure), the routine proceeds to an end at block 510. Otherwise, at block 506, the CDN service provider 106 identifies one or more destination POPs 116 with spare capacity to spread the surged traffic.

Illustratively, the CDN service provider 106 may initially identify a destination POP closest to the source POP among all the POPs 116. The determination of distance between the destination POP and source POP can be based on various factors, such as estimated spare capacity, geographic or network-based proximity to the source POP or clients generating the traffic surge, groups of resources currently being served, latency, bandwidth, reliability or performance factors, combinations of the same, or the like. In some embodiments, POPs 116 associated with a current traffic surge alert themselves are excluded from being identified as a destination POP.

In some embodiments, once a destination POP 116 is identified, the CDN service provider 106 calculates an aggregate spare capacity between the source and the identified destination POP(s). If the aggregate spare capacity is still not sufficient to absorb the traffic surge (e.g., the estimated traffic surge traffic exceeds the aggregate spare capacity), the CDN service provider 106 proceeds to identify a next closest destination POP among the remaining POPs. The CDN service provider 106 then adds to the aggregate spare capacity an estimated spare capacity of the newly identified destination POP and determines whether the updated aggregate spare capacity is sufficient to absorb the traffic surge. This process can be repeated many times until the aggregate spare capacity is sufficient.

In some embodiments, after all applicable destination POPs have been identified and corresponding spare capacity accounted for, the aggregate spare capacity may still be insufficient to absorb the traffic surge. In these embodiments, the CDN service provider 106 may cause routing of such surged traffic exclusively to a specific POP or set of POPs, thereby eliminating its impact on other POPs. Further, tarpitting or other network traffic control mechanisms can be implemented by the specific POP or set of POPs to ensure a certain level of service availability thereon.

At block 508, the CDN service provider 106 may cause routing of at least a portion of future traffic corresponding to the target resource group to identified destination POPs. Illustratively, the CDN service provider 106 may determine a policy or mechanism for routing incoming content requests for network resources corresponding to the target group, in accordance with the estimated spare capacities associated with the source POP and/or destination POPs. In some embodiments, the routing policy may correspond to a probabilistic or otherwise randomized decision scheme, where an incoming resource request is more likely to be routed to a POP associated with a larger spare capacity. The routing policy can be implemented for a future period of time, when at least some incoming requests for the target group will be routed to one of the destination POPs in accordance with the determined routing policy. The routine of FIG. 5 terminates at block 510.

Figure 6:
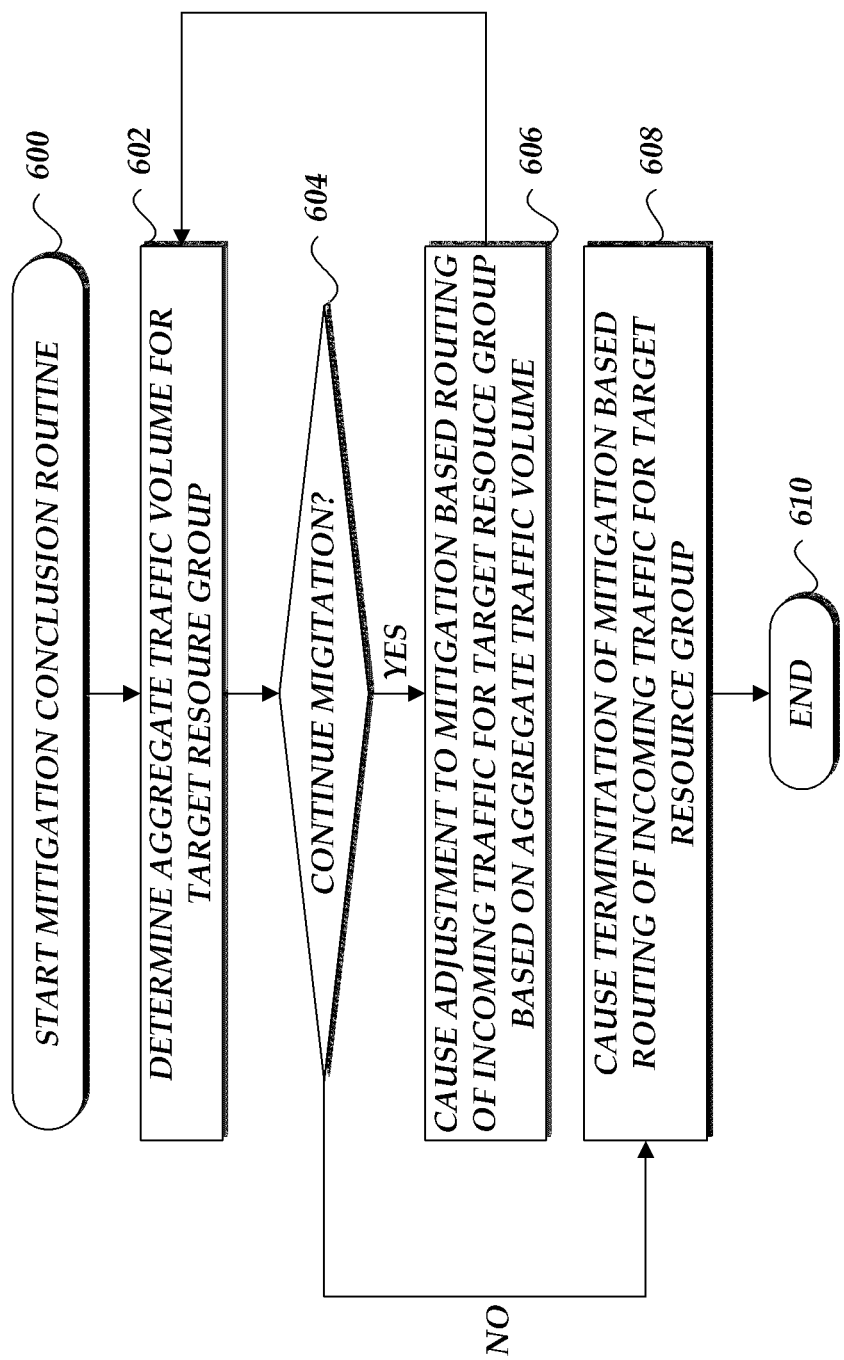
FIG. 6 is a flowchart illustrative of a routine implemented by a content delivery network service provider to conclude traffic surge mitigation.

FIG. 6 is a flowchart illustrative of a routine implemented by a CDN service provider 106 to conclude traffic surge mitigation. The routine starts at block 600. At block 602, while incoming traffic is routed in accordance with a traffic surge mitigation based routing policy or mechanism, the CDN service provider 106 determines an aggregate traffic volume for a resource group currently considered a target of traffic surge traffic. Illustratively, the CDN service provider 106 monitors request volumes for the target group received at the source and destination POPs as incoming traffic is routed during each time period. In doing so, the CDN service provider 106 may calculate an aggregate request volume for the target group based on respect volumes received at each applicable POP (e.g., by adding up respective request volumes received at each applicable POP during a most recent time period).

At block 604, the CDN service provider 106 decides whether to continue traffic surge mitigation based on the determined aggregate traffic volume. In some embodiments, the CDN service provider 106 may compare the aggregate traffic volume for a most recent time period to an estimated spare capacity of the source POP for the next time period, and determine whether the source POP may adequately process the aggregate volume (e.g., whether the source POP spare capacity exceeds the aggregate traffic volume by a predetermined margin). In some embodiments, the CDN service provider 106 may determine whether the aggregate traffic volume for a most recent period of time (or a weight average of aggregate volumes for a number of recent time periods) has returned to a level consistent with a traffic volume for the target group received at the source POP prior to the detection of traffic surge (e.g., not exceeding a maximum volume among a determined number of time periods prior to the detection of traffic surge).

If the CDN service provider 106 determines to continue the traffic surge mitigation, at block 606, the CDN service provider 106 causes adjustments to incoming traffic routing for the target group in a future time period based on the determined aggregate traffic volume. Similarly to relevant steps in the routine of FIG. 4, the CDN service provider 106 may determine whether a current aggregate spare capacity of the source and identified destination POPs is sufficient to absorb the aggregate traffic volume (e.g., whether the current aggregate spare capacity exceeds the aggregate traffic volume by a margin). If not, the CDN service provider 106 identifies additional destination POPs until the aggregate spare capacity is sufficient. In some embodiments, the CDN service provider 106 may remove one or more destination POPs currently in use, due to a surplus of aggregate spare capacity or other performance issues. Similarly to relevant steps in the routine of FIG. 4, in some embodiments, after all applicable destination POPs have been identified and corresponding spare capacity accounted for, the aggregate spare capacity may still be insufficient to absorb the aggregate traffic volume. In these embodiments, the CDN service provider 106 may cause routing of such traffic exclusively to a specific POP or set of POPs, thereby minimizing its impact on other POPs.

The CDN service provider 106 may modify the current policy or mechanism for routing incoming content requests for network resources corresponding to the target group, in accordance with currently estimated spare capacities associated with the source POP and/or destination POPs. The modified routing policy can be implemented for a future period of time, when at least some incoming requests for the target group will be routed to one of the destination POPs in accordance with the modified routing policy.

Referring back to block 604, if the CDN service provider 106 determines not to continue the mitigation, the routine of FIG. 6 proceeds to block 608. At block 608, the CDN service provider 106 causes a termination of the mitigation based incoming traffic routing for the target resource group. Illustratively, the CDN service provider 106 may cancel or deactivate relevant routing policies for offloading or spreading incoming traffic directed at the source POP for the target resource group. The routine of FIG. 6 ends at block 610.

Figure 7:
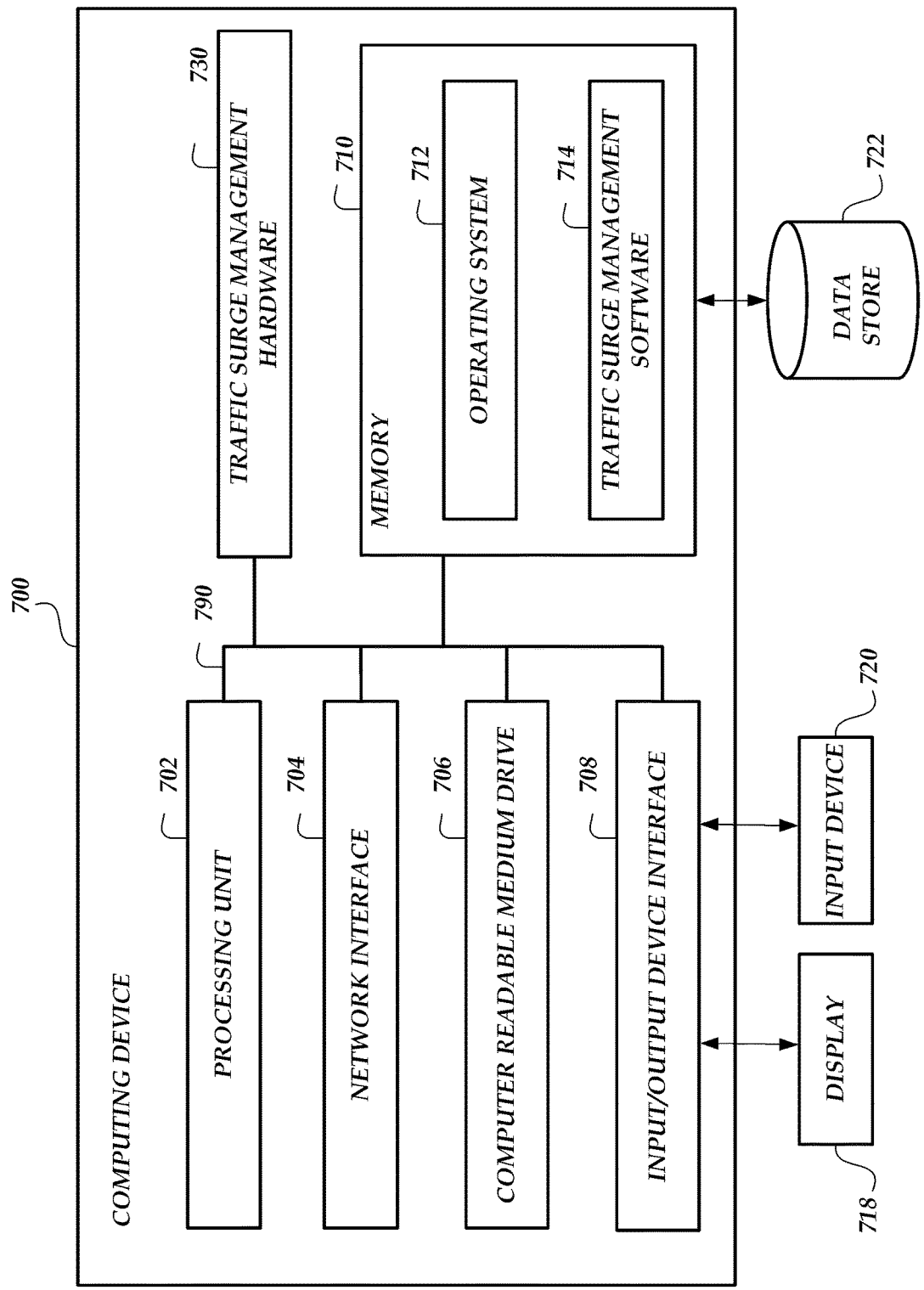
FIG. 7 is an illustrative functional block diagram of a computing device for detecting and mitigating traffic surge.

FIG. 7 is an illustrative functional block diagram of a computing device for detecting and mitigating traffic surge. The computing device 700 can be a server or other computing device, and can comprise a processing unit 702, a network interface 704, a computer readable medium drive 706, an input/output device interface 708, and a memory 710. The network interface 704 can provide connectivity to one or more networks or computing systems. The processing unit 704 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments. The memory 710 generally includes RAM, ROM, and/or other persistent, non-transitory computer readable media. The memory 710 can store an operating system 712 that provides computer program instructions for use by the processing unit 702 or other elements included in the computing device in the general administration and operation of the computing device 700. The memory 710 can further include computer program instructions and other information for implementing aspects of the present disclosure. For example, in one embodiment, the memory 710 includes traffic surge management software 714 that implements aspects of the present disclosure. The traffic surge management software 714 may illustratively correspond to all or some of the components of the request routing service 120, traffic surge detection service 130, traffic surge mitigation service 140 or other relevant components depicted in FIG. 1, or the illustrative routines of FIG. 4, 5 or 6.

The computing device 700 may further comprise traffic surge management hardware 730. The traffic surge management hardware 730 may illustratively implement aspects of the present disclosure, such as the components depicted in FIG. 1 or the illustrative routines of FIG. 4, 5 or 6. In some embodiments, the traffic surge hardware 730 may be implemented in part with the processing unit 702, the computer readable medium drive 706, or other elements of the computing device 700.

The elements included in the computing device 700 may be coupled by a bus 790. The bus 790 may be a data bus, communication bus, or other bus mechanism to enable the various components of the computing device 700 to exchange information. In some embodiments, the computing device 700 may include additional or fewer components than are shown in FIG. 7. For example, a computing device 700 may include more than one processing unit 702 and computer readable medium drive 706. In another example, the computing device 702 may not be coupled to a display 718 or an input device 720. In still another example, the traffic surge management software 714 or the traffic surge management hardware 730 may include various interdependent or independent subcomponents implementing different aspects of the present disclosure. In some embodiments, two or more computing devices 700 may together form a computer system for executing features of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for detecting traffic surges on networks, the computer-implemented method comprising:

under control of one or more computing devices configured with specific computer executable instructions, obtaining first data regarding requests for network resources received at a first point of presence (POP) of a plurality of POPs during a recent period of time, wherein the first data includes a first list of resource groups, wherein each resource group of the first list is associated with a first request volume of network resource requests associated with the resource group received at the first POP during the recent period of time, and wherein the first list of resource groups is ordered based on the associated first request volumes;

comparing the first data against second data regarding requests for network resources received at the first POP during a second period of time before the recent period of time, wherein the second data includes a second list of resource groups, wherein each resource group of the second list is associated with a second request volume quantifying network resource requests corresponding to the resource group received at the first POP during the second period of time, and wherein the second list of resource groups is ordered based on the associated second request volumes;

identifying a target resource group common to both the first and second lists as a resource group currently receiving flash crowd traffic based, at least in part, on the comparison between the first data and the second data, wherein the target resource group is ranked higher than a first threshold position in the first list and ranked lower than a second threshold position in the second list; and generating a traffic surge alert based on the identified target resource group.

2. The computer-implemented method of claim 1, wherein the second period of time immediately precedes the recent period of time.

3. The computer-implemented method of claim 1, wherein the target resource group corresponds to at least one of a Web page, Web application, Web site, domain, or subdomain.

4. The computer-implemented method of claim 1, wherein the first threshold position is predetermined.

5. The computer-implemented method of claim 1, wherein the first threshold position is higher in ranking than the second threshold position.

6. The computer-implemented method of claim 1, wherein the first request volume associated with the target resource group is larger in quantity than the second request volume associated with the target resource group.

7. The computer-implemented method of claim 1, wherein identifying the target resource group further comprises computing a difference or ratio between the first request volume associated with the target resource group and the second request volume associated with the target resource group.

8. The computer-implemented method of claim 7, wherein identifying the target resource group further comprises determining whether the difference or ratio satisfies a threshold criterion.

9. The computer-implemented method of claim 8, wherein the threshold criterion is based, at least in part, on the second request volume associated with the target resource group.

10. The computer-implemented method of claim 1, wherein identifying the target resource group is further based on a rate of change in request volume.

11. A non-transitory computer readable storage medium storing computer executable instructions that when executed by a processor perform operations comprising:

identifying a target resource group from a first list of resource groups, wherein each resource group of the first list of resource groups is associated with a first request volume for network resource requests for the respective resource group received at a point of presence (POP) during a first period of time;

locating the target resource group within a second list of resource groups, wherein each resource group of the second list of resource groups is associated with a second request volume for network resource requests for the respective resource group received at the POP during a second period of time, and wherein the second period of time precedes the first period of time;

determining that the target resource group is receiving a traffic surge at the POP based, at least in part, on a difference between the first request volume and the second request volume; and generating an indication based on the determined target resource group receiving a traffic surge.

12. The non-transitory computer readable storage medium of claim 11, wherein identifying the target resource group comprises identifying the target resource group based, at least in part, on a first ranking of the target resource group.

13. The non-transitory computer readable storage medium of claim 12, wherein identifying the target resource group further comprises determining that the first ranking is higher than a threshold ranking.

14. The non-transitory computer readable storage medium of claim 11, wherein determining the target resource group as receiving traffic surge comprises determining that the difference between the first request volume and second request volume is larger than a threshold value.

15. The non-transitory computer readable storage medium of claim 11, wherein the second period of time and the first period of time correspond to consecutive time periods.

16. The non-transitory computer readable storage medium of claim 11, wherein the operations further comprise locating the target resource group within a third list of resource groups, wherein each resource group of the third list of resource groups is associated with a third request volume quantifying network resource requests corresponding to the respective resource group received at the POP during a third period of time, and wherein the third period of time precedes the second period of time.

17. The non-transitory computer readable storage medium of claim 16, wherein determining the target resource group as receiving a traffic surge is further based, at least in part, on a difference between the first request volume and the third request volume.

18. A system comprising:
   at least one data store configured to at least store computer-executable instructions; and
   at least one processor in communication with the data store, the processor configured to execute the computer-executable instructions to at least:
      identify a target resource group from a first list of resource groups, wherein the resource groups of the first list of resource groups are associated with a first request volume quantifying network resource requests corresponding to the resource group received at a point of presence (POP) during a first period of time;
      obtain data regarding a plurality of second lists of resource groups, wherein the second lists correspond to respective second periods of time preceding the first period of time, and wherein the resource groups of each second set are associated with a respective second request volume quantifying network resource requests corresponding to the resource group received at the POP during a corresponding second period of time;
      locate the target resource group within at least one of the second lists;
      determine that the target resource group is receiving a traffic surge based, at least in part, on a difference between an attribute of a first request volume associated with the target resource group and a function of respective second request volume attributes of the target resource group within at least a subset of the plurality of second lists of resource groups; and
      generate an indication based on the determined target resource group receiving a traffic surge.

19. The system of claim 18, wherein the computer-executable instructions further determine a reference request volume for the target resource group based, at least in part, on one or more second request volumes associated with the target resource group.

20. The system of claim 19, wherein computer-executable instructions further determine that the target resource group is receiving a traffic surge based at least in part on a relationship between the first request volume associated with the target resource group and the reference request volume.

* * * * *